United States Patent
Kim et al.

(10) Patent No.: US 11,463,880 B2
(45) Date of Patent: Oct. 4, 2022

(54) DYNAMIC SECURITY ANALYSIS METHOD FOR CONTROL PLANE AND SYSTEM THEREFORE

(71) Applicant: Korea Advanced institute of Science and Technology, Daejeon (KR)

(72) Inventors: Yongdae Kim, Daejeon (KR); Hongil Kim, Daejeon (KR); Jiho Lee, Daejeon (KR); Eunkyu Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 464 days.

(21) Appl. No.: 16/716,055

(22) Filed: Dec. 16, 2019

(65) Prior Publication Data

US 2020/0213854 A1 Jul. 2, 2020

(30) Foreign Application Priority Data

Dec. 28, 2018 (KR) .......................... 10-2018-0172643
Sep. 19, 2019 (KR) .......................... 10-2019-0115246
Dec. 2, 2019 (KR) .......................... 10-2019-0158031

(51) Int. Cl.
*H04W 12/108* (2021.01)
*H04L 69/22* (2022.01)
(Continued)

(52) U.S. Cl.
CPC ....... *H04W 12/108* (2021.01); *G06F 11/3684* (2013.01); *G06K 9/6282* (2013.01); *H04B 1/0003* (2013.01); *H04L 9/3242* (2013.01); *H04L 69/22* (2013.01); *H04W 12/106* (2021.01); *H04W 12/122* (2021.01)

(58) Field of Classification Search
CPC ............ H04W 12/108; H04W 12/106; H04W 12/122; H04W 12/12; H04W 24/06; H04W 12/00; H04W 12/10; G06F 11/3684; G06F 11/36; G06K 9/6282; G06K 9/62;
(Continued)

(56) References Cited

U.S. PATENT DOCUMENTS 9,007,922 B1 * 4/2015 Mittal ................. H04L 43/0805
370/242
10,318,653 B1 * 6/2019 Khoo .................. G06F 11/3668
(Continued)

OTHER PUBLICATIONS

Mohsin, Muhammad. "Security policy management for a cooperative firewall." (2018). (Year: 2018).*
(Continued)

*Primary Examiner* — Techane Gergiso
(74) *Attorney, Agent, or Firm* — Foley & Lardner LLP (57) ABSTRACT

A security analysis method for a control plane and a system therefor are disclosed. The method includes generating a test case for a security property unsuitable for a control plane operation, transmitting the generated test case to target equipment and receiving a response of the control plane for the test case from the target equipment, and diagnosing security for the security property of the target equipment by analyzing the received response. The generating includes generating the test case for the security property by modulating a value of a specific field in a control plane protocol header into a value unsuitable for an operation on standards.

18 Claims, 7 Drawing Sheets

(51) Int. Cl.
   *G06F 11/36* (2006.01)
   *H04W 12/106* (2021.01)
   *H04W 12/122* (2021.01)
   *G06K 9/62* (2022.01)
   *H04B 1/00* (2006.01)
   *H04L 9/32* (2006.01)

(58) Field of Classification Search
   CPC ....... H04B 1/0003; H04B 1/00; H04L 9/3242; H04L 69/22; H04L 9/40; H04L 9/32
   See application file for complete search history.

(56) References Cited

U.S. PATENT DOCUMENTS

| | | | |
|---|---|---|---|
| 10,659,571 B1* | 5/2020 | Volpe | H04L 69/22 |
| 2007/0064621 A1* | 3/2007 | Luken | H04L 41/0866 |
| | | | 709/223 |
| 2011/0069621 A1* | 3/2011 | Gintis | H04L 43/50 |
| | | | 370/250 |
| 2015/0106670 A1* | 4/2015 | Gintis | G01R 31/31813 |
| | | | 714/712 |
| 2017/0251077 A1* | 8/2017 | Kumar Eerpini | H04L 49/90 |
| 2018/0241627 A1* | 8/2018 | Rodrigues | H04L 41/0813 |
| 2018/0314612 A1* | 11/2018 | Shaikh | G06F 11/004 |
| 2018/0375754 A1* | 12/2018 | Mirsky | G06F 9/45558 |
| 2019/0173764 A1* | 6/2019 | Di Martino | H04L 41/12 |

OTHER PUBLICATIONS

Kim, et al., "Touching the Untouchables: Dynamic Security Analysis of the LTE Control Plane," IEEE Computer Society, 19 pages (2019).

* cited by examiner

DYNAMIC SECURITY ANALYSIS METHOD FOR CONTROL PLANE AND SYSTEM THEREFORE

CROSS-REFERENCE TO RELATED APPLICATIONS

This application claims priority under 35 U.S.C. § 119 to Korean Patent Application No. 10-2018-0172643 filed on Dec. 28, 2018, Korean Patent Application No. 10-2019-0115246 filed on Sep. 19, 2019, and Korean Patent Application No. 10-2019-0158031 filed on Dec. 2, 2019, in the Korean Intellectual Property Office, the disclosures of which are incorporated by reference herein in their entireties.

This work was supported by Institute for Information & communications Technology Planning & Evaluation (IITP) grant funded by the Korea government (MSIT) (2018-0-00831, A Study on Physical Layer Security for Heterogeneous Wireless Network).

BACKGROUND

Embodiments of the inventive concept described herein relate to technologies of analyzing dynamic security of a control plane, and more particularly, relate to a dynamic security analysis method for automatically detecting vulnerabilities generated due to incorrect implementation and operation settings of network equipment and a terminal, which take charge of control plane protocol communication of a mobile communication network on the mobile communication network, for example, long term evolution (LTE) network and a system therefor.

Because a control plane in a mobile communication network is one of important elements which affect the quality of experience of a user on a real network, it is very important to check an accurate operation and security of control plane procedures. Thus, detecting abnormal operations and security threats occurring in the control plane procedures and finding and solving the cause thereof is a very important technology in mobile communication equipment vendors and carriers.

Detailed control plane procedures and operations of the mobile communication network are defined in a standard organization known as $3^{rd}$ generation partnership project (3GPP). Herein, standards describing control plane operations are written based on vast amounts of natural languages, and a detailed implementation method is not specified and conforms to implementation of vendors or policies of network operators.

Test cases for a conformance test for verifying whether a mobile communication terminal operates to suit 3GPP standards are defined in the 3GPP standards. Thus, vendors may verify whether terminals developed through the conformance test may receive normal services in various situations from a commercial mobile communication network. However, because the test cases for the conformance test are configured with only operations and messages in the form of failing to violate the standards, they verify only standard operation procedure. Thus, processes or test cases capable of verifying whether to correctly process an abnormal operation which violates the standards are not defined in the standards.

Furthermore, because the standards for the conformance test provide test cases for only operations of a mobile communication terminal and because test cases for network equipment are not defined in the standards, there is no process capable of performing a conformance test for standards of mobile communication network equipment.

For equipment which plays the same role depending on operation policies, a commercial mobile communication network uses equipment of several vendors and is very complexly structured to support terminals of several vendors. Therefore, as a vendor of each piece of equipment is changed, forms of operations and vulnerabilities of control plane protocols are varied.

Thus, because a detailed operation implementation scheme is not defined on the standards and because there is no a standardized test process for non-standard operations of network equipment and terminals and message transmission, incorrect implementations are made by vendors implementing mobile communication equipment and terminals or vulnerabilities on control plane protocols may occur according to incorrect network configuration policies and settings of network operators. Because it is unable to find such vulnerabilities through the standardized security analysis of technology defined in the standards, there is a need for dynamic security analysis with respect to equipment to be diagnosed.

SUMMARY

Embodiments of the inventive concept provide a dynamic security analysis method for automatically detecting vulnerabilities generated due to incorrect implementation and operation settings of network equipment and a terminal, which take charge of control plane protocol communication of a mobile communication network and a system therefor.

In detail, embodiments of the inventive concept provide a dynamic security analysis method for generating a test case causing an abnormal operation unsuitable for a control plane protocol specification, analyzing a control plane message response and state change information, which are generated when executing the test case, detecting an abnormal operation (or vulnerabilities) of target equipment, and diagnosing the cause of the abnormal operation (or vulnerabilities) and a system therefor.

According to an exemplary embodiment, a security analysis method for a control plane may include generating a test case for a security property unsuitable for a control plane operation, transmitting the generated test case to target equipment and receiving a response of the control plane to the test case from the target equipment, and diagnosing security for the security property of the target equipment by analyzing the received response.

The generating may include generating the test case for the security property by modulating a value of a specific field in a control plane protocol header into a value unsuitable for an operation on standards.

The specific field may include at least one of a sequence number field, a security header type field, and a message authentication code (MAC) field.

The generating may include generating the test case for the security property by modulating the value of the specific field into the value unsuitable for the operation on the standards and filling values of the other fields using field values extracted from a mobile communication network log.

The diagnosing may include diagnosing the security for the security property by analyzing the received response using a predefined decision tree.

The diagnosing may include detecting an abnormal operation of the target equipment by analyzing the received response and information about a state change caused by the test case.

The receiving may include transmitting the generated test case to the target equipment using a software defined radio (SDR) and receiving the response to the test case using the SDR.

According to an exemplary embodiment, a security analysis method for a control plane may include generating a test case for a security property unsuitable for a control plane operation, transmitting the generated test case to target equipment and receiving a response of the control plane to the test case from the target equipment, and diagnosing security for the security property of the target equipment by analyzing the received response using a predefined decision tree.

According to an exemplary embodiment, a security analysis system for a control plane may include a generator that generates a test case for a security property unsuitable for a control plane operation, a transceiver that transmits the generated test case to target equipment and receives a response of the control plane to the test case from the target equipment, and an analyzer that diagnoses security for the security property of the target equipment by analyzing the received response.

The generator may generate the test case for the security property by modulating a value of a specific field in a control plane protocol header into a value unsuitable for an operation on standards.

The specific field may include at least one of a sequence number field, a security header type field, and a message authentication code (MAC) field.

The generator may generate the test case for the security property by modulating the value of the specific field into the value unsuitable for the operation on the standards and filling values of the other fields using field values extracted from a mobile communication network log.

The analyzer may diagnose the security for the security property by analyzing the received response using a predefined decision tree.

The analyzer may detect an abnormal operation of the target equipment by analyzing the received response and information about a state change caused by the test case.

The transceiver may transmit the generated test case to the target equipment using a software defined radio (SDR) and may receive the response to the test case using the SDR.

According to an exemplary embodiment, a security analysis method for a control plane may include generating a test case for a security property unsuitable for a control plane operation by modulating a value of a specific field in a control plane protocol header into a value unsuitable for an operation on standards, transmitting the generated test case to target equipment and receiving a response of the control plane to the test case from the target equipment, and diagnosing security for the security property of the target equipment by analyzing the received response.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

A mobile communication network is employed in various industries such as train control, a disaster network, and Internet of things (IoT) communication as well as data communication and call. Particularly, as the mobile communication network is introduced into services associated with safety of a user, a security accident and a performance problem in the mobile communication network may have a direct influence on the safety of the user. Furthermore, a security accident due to security vulnerabilities in mobile communication network equipment may lead to economic loss of a manufacturer of the equipment having the vulnerabilities as well as a network operator.

In standards, guidelines (a conformance test) for correct operations and implementations of terminals and equipment of a mobile communication network are defined, but guidelines for test associated with security are not defined. Thus, a manufacturer of a terminal and communication network equipment implements the terminal and the communication network equipment to operate normally according to the standards, but, although the terminal and the communication network equipment are implemented according to the standards in association with security, it is unable to ensure the implementation, which may be varied according to the implementation of the manufacturer and environment configuration of a network operator.

To address such problems, embodiments of the inventive concept may be the gist of automatically detecting vulnerabilities generated due to incorrect implementation or operation settings of network equipment and a terminal, which take charge of control plane protocol communication of a mobile communication network and diagnosing the cause of the vulnerabilities.

In this case, embodiments of the inventive concept may write a test case of a target control plane protocol to check encryption, integrity, and availability of a communication message. Embodiments of the inventive concept may fill a field corresponding to a security property to be diagnosed, depending on the purpose, and may fill the other portions (or fields) using previously collected mobile communication network logs, for example, field values extracted from normal traffic, thus generating a test case.

In addition, embodiments of the inventive concept may transmit a test case to target equipment, for example, a terminal or communication network equipment, using an open source and a software defined radio (SDR) and may analyze a response received from the target equipment depending on a predefined decision tree, thus diagnosing security for security property of the target equipment.

Figure 1:
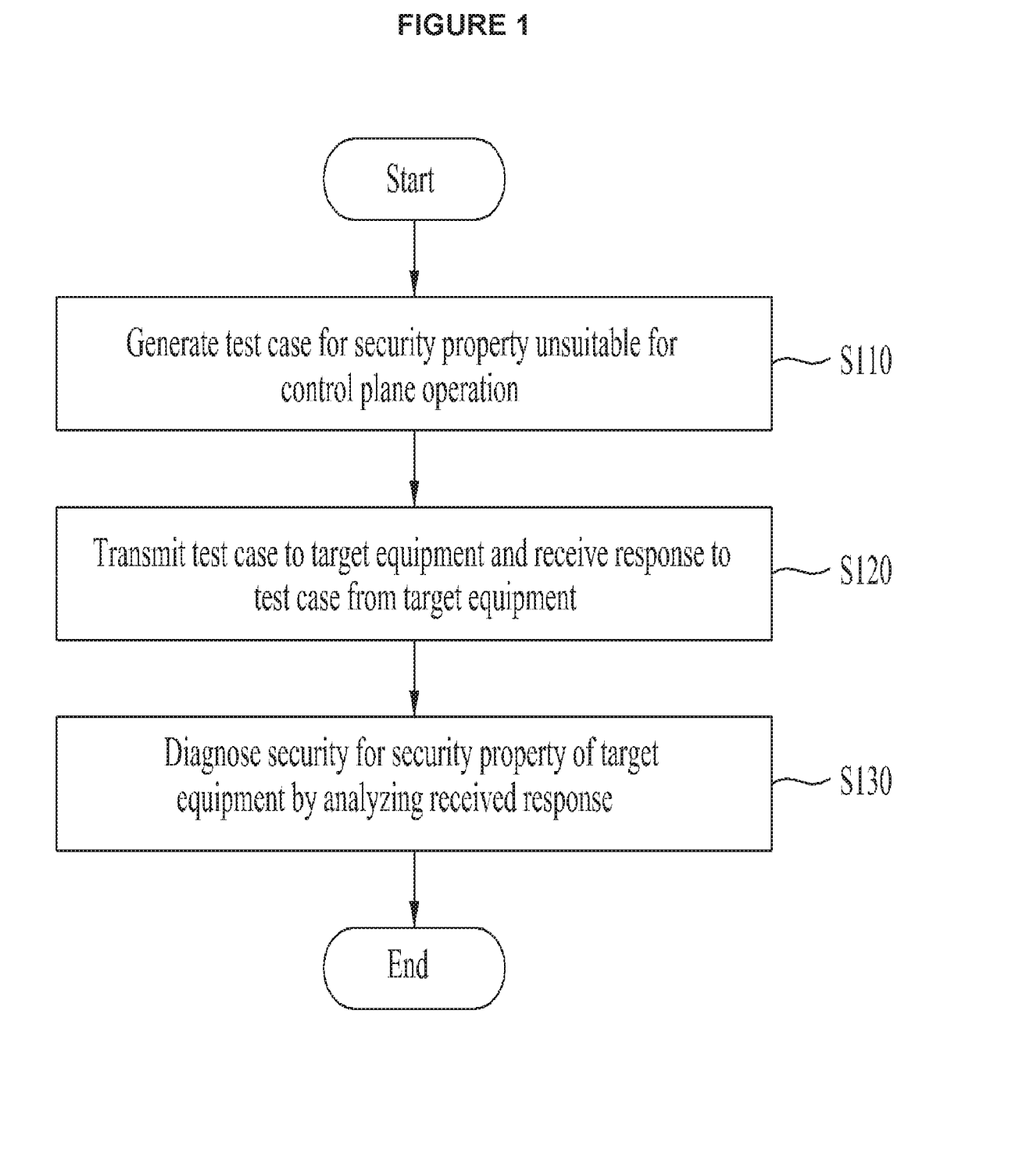
FIG. 1 is an operational flowchart illustrating a security analysis method for a control plane according to an embodiment of the inventive concept.

FIG. 1 is an operational flowchart illustrating a security analysis method for a control plane according to an embodiment of the inventive concept.

Referring to FIG. 1, in the dynamic security analysis method for control plane according to an embodiment of the inventive concept, in S110, a test case for security property unsuitable for a control plane operation, for example, a non-standard test case may be generated.

Herein, S110 may be to generate the test case for the security property by modulating a value of a specific field in a control plane protocol header into a value unsuitable for an operation on standards. The specific field of the control plane protocol header may include at least one of a sequence number field, a security header type field, and a message authentication code (MAC) field.

In addition, S110 may be to generate the test case for the security property by modulating the value of the specific field into the value unsuitable for the operation on the standards and filling values of the other fields using field values extracted from a mobile communication network log.

In addition, S110 may be to implement test cases for dynamic security test using a testing language based on a standard specification supported by 3rd generation partnership project (3GPP) which is a mobile communication standard organization, for example, testing and test control notation version 3 (TTCN-3).

When the non-standard test case is generated in S110, in S120, the generated test case may be transmitted to target equipment, for example, a terminal or communication network equipment and a response to the non-standard test case is received from the target equipment.

Herein, S120 may be to transmit the generated test case to the target equipment using an SDR and receive the response to the test case using the SDR.

When the response to the non-standard test case is received from the target equipment in S120, in S130, security for security property of the target equipment may be diagnosed by analyzing the received response.

Herein, S130 may be to diagnose the security for the security property by analyzing the received response using a predefined decision tree and detect an abnormal operation of the target equipment by analyzing the received response and information about a state change caused by the test case.

A description will be given of such a method according to an embodiment of the inventive concept with reference to FIGS. 2 to 6.

Figure 2:
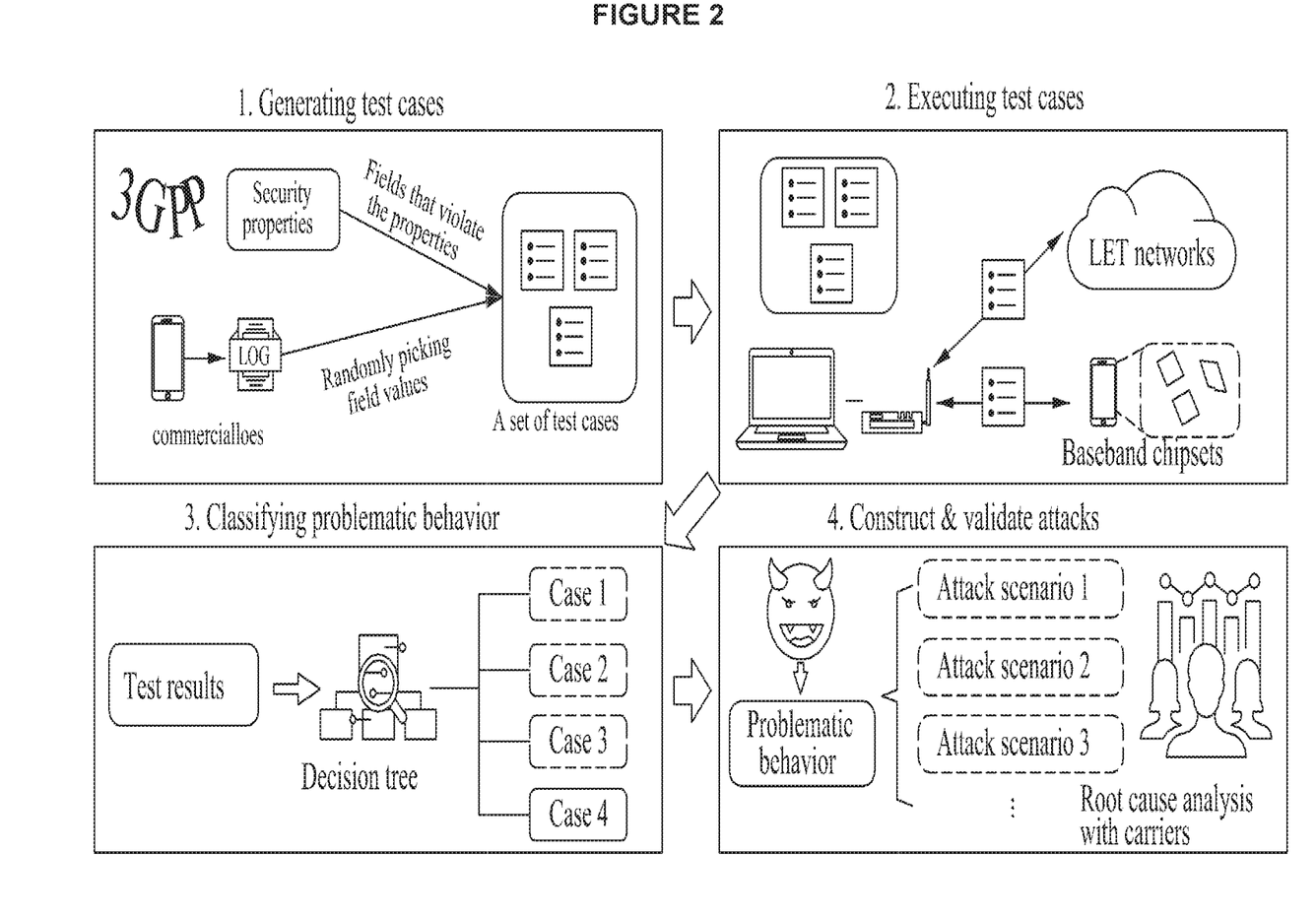
FIG. 2 is a drawing illustrating a method according to an embodiment of the inventive concept.
Figure 3:
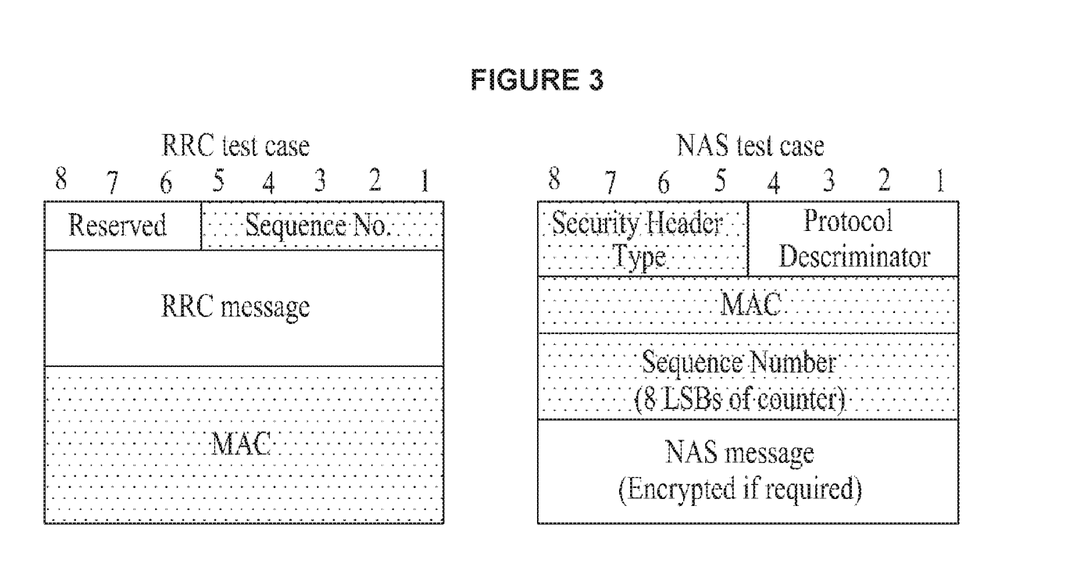
FIG. 3 is a drawing illustrating a header field modulated to generate a non-standard test case.
Figure 4:
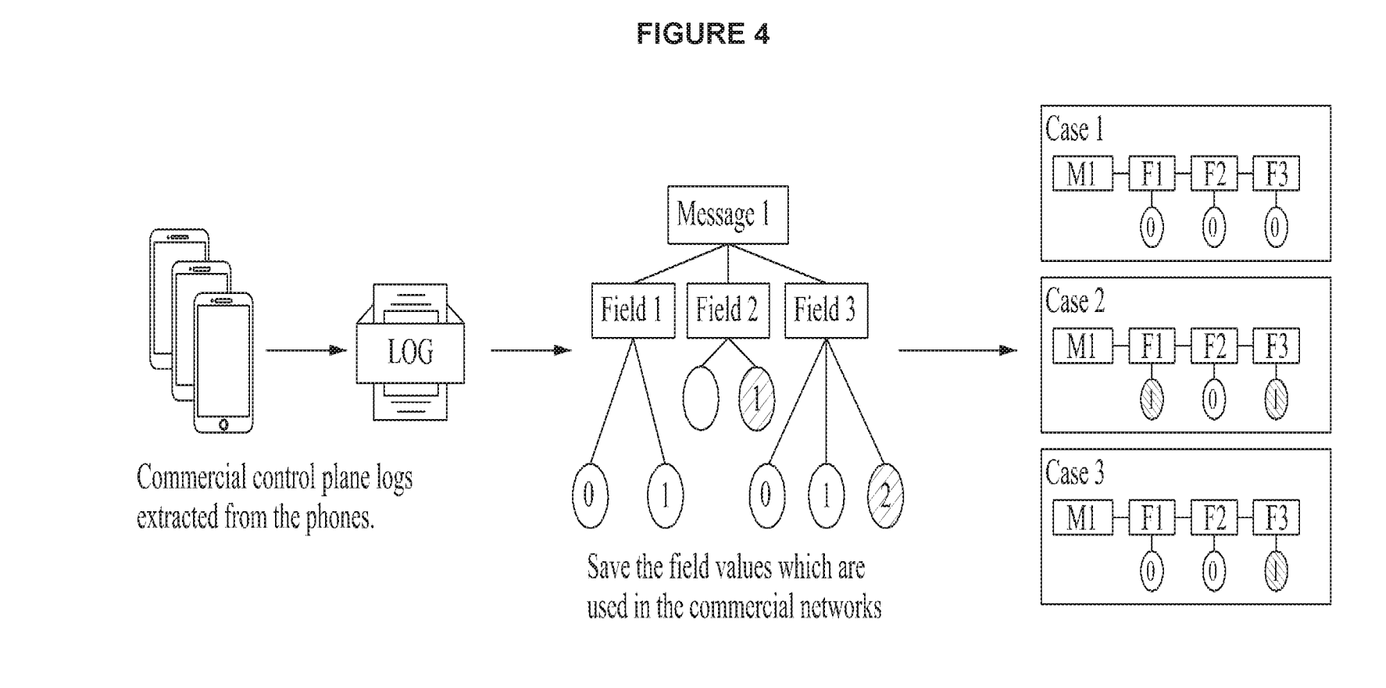
FIG. 4 is a drawing illustrating a process of generating a test case using a mobile communication network log.

FIG. 2 is a drawing illustrating a method according to an embodiment of the inventive concept. FIG. 2 is an overview diagram illustrating a technology for dynamic security analysis for a control plane protocol. FIG. 3 is a drawing illustrating a header field modulated to generate a non-standard test case. FIG. 4 is a drawing illustrating a process of generating a test case using a mobile communication network log.

As shown in FIG. 2, the method according to an embodiment of the inventive concept may include a process of generating non-standard test cases unsuitable for a standard control plane operation to detect vulnerabilities of network equipment in a mobile communication network and a process of executing automated test cases and detecting an abnormal operation (including executing the test cases, classifying problematic behavior, and constructing and validating attacks).

The process of generating the test cases may roughly use two methods to generate test cases unsuitable for a control plane operation defined in standards First of all, a value of a specific field in a header of a control plane protocol message may be modulated into a value unsuitable for an operation on the standards.

In this case, as shown in FIG. 3, a header field to be modulated may include at least one of a sequence number field, a security header type field, and a message authentication code (MAC) field.

For example, the sequence number field is used for the purpose of preventing a replay attack in a control plane protocol. Thus, it is defined in the standards to increase a sequence number by 1 when transmitting and receiving a message and receive the message only once for one sequence number. In the test case according to an embodiment of the inventive concept, a sequence number may be modulated into a value less than a normal value to verify whether target equipment accurately check a sequence number to prevent a replay attack. Next, the security header type may be roughly classified as "Plain header", "Integrity protected", "Integrity protected and ciphered", or the like. It is defined to prevent security threats by using a proper security heard type depending on an operation. Thus, in the process of generating the test cases, the security header type may be set to be different from a value defined in the standards to verify whether the target equipment accurately checks the security header type. The MAC may be a value for verifying whether a message is modulated. A MAC value may be randomly set when generating the test cases to verify whether the target equipment accurately checks whether the message is modulated.

After the message header value of the test case is modulated to be unsuitable for the standards through the above-mentioned process, as shown in FIG. 4, a mobile communication network log, for example, a commercial mobile communication network log may be used to fill a format of the message and the other fields. Herein, an embodiment of the inventive concept may receive vast amounts of commercial mobile communication logs, may automatically extract fields of a message generated in a commercial network, and may select any of the extracted field values when generating the test cases to configure the test cases.

The test cases may be generated through such a process to reduce an effort to identify all of vast amounts of standard operations and implement a message format. A message field which is not implemented in target network equipment may not be used to prevent the equipment from being shut down. Herein, the reason of considering only the commercial log inputs is to prevent an unexpected collision of a receiving node (or a receiving entity) due to a parsing error.

The process of executing the test cases and detecting the abnormal operation may be to transmit the test message (or the test cases) generated through the process of generating the test cases to mobile communication equipment and a terminal, obtain received control plane response and state change information, and detect an abnormal operation of the target equipment. In this case, a software defined radio (SDR) may be used to transmit the non-standard test message to the target network equipment and the terminal and receive the response.

Figure 5:
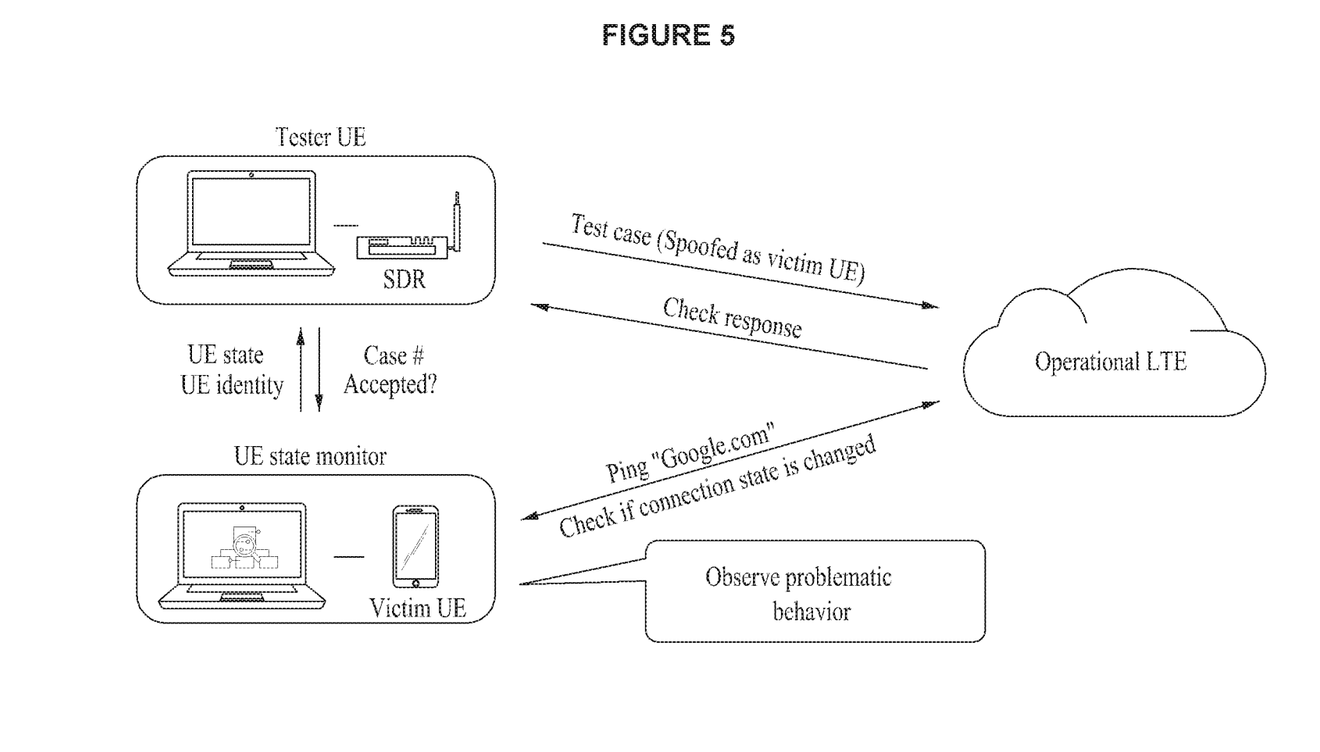
FIG. 5 is a drawing illustrating a process of executing an automated test case and detecting an abnormal operation.

FIG. 5 is a drawing illustrating a process of executing an automated test case and detecting an abnormal operation. As shown in FIG. 5, a tester UE configured with a computer and an SDR may transmit a test message to target network equipment and may record the response. Next, a UE state monitor may record a state change capable of occurring due to the execution of test cases using a victim UE normally connected to the target network equipment. It may be verified whether an abnormal operation, for example, vulnerabilities, occurs in target equipment when executing the test cases, using the recording of the response and the state change.

Figure 6:
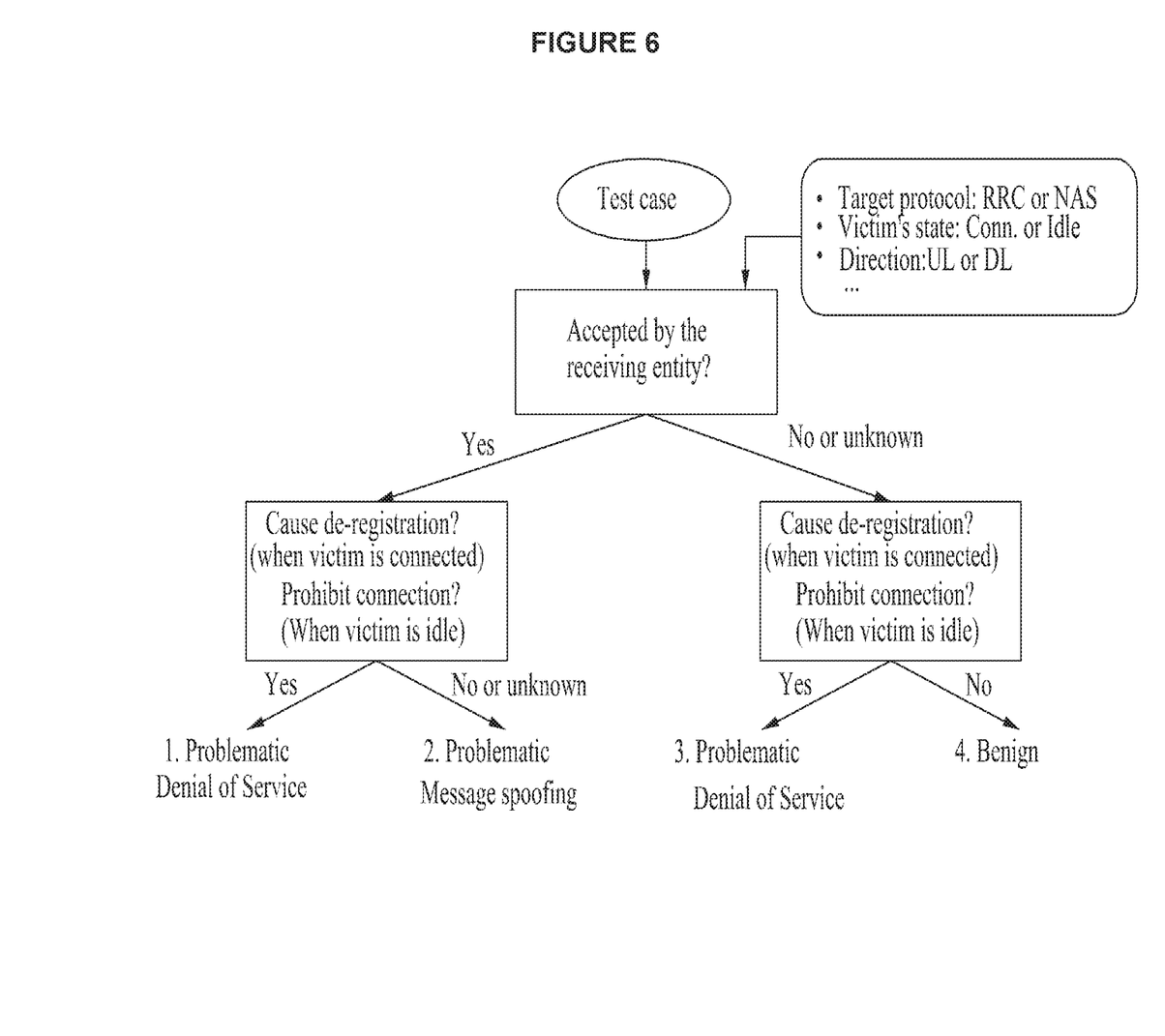
FIG. 6 is a drawing illustrating a decision tree for detecting vulnerabilities.

FIG. 6 is a drawing illustrating a decision tree for detecting vulnerabilities. As shown in FIG. 6, it may be verified whether a corresponding test message is processed in equipment based on a response occurring when test cases are executed. To this end, a method according to an embodiment of the inventive concept may define a response when the equipment processes a message normally generated according to standards and may determine that the message is processed when the response is received when executing the test cases. In this case, because all the test cases are non-standard messages, it is first determined as an abnormal operation to verify whether a state changes from "registered" to "deregistered" due to the corresponding test cases. In this case, when there is a state change, the method according to an embodiment of the inventive concept may classify it as vulnerabilities in which a denial of service (DoS) attack may occur. When there is no state change, the method according to an embodiment of the inventive concept may classify it as vulnerabilities in which a spoofing attack may occur.

Although the test message is not processed in the target equipment in a first decision phase, when there is a state change, it may be classified as vulnerabilities in which a DoS attack may occur. Thus, upon the execution of the test cases, only when there is no response and when there is no state change, it may be classified as a normal operation.

A description will be given in detail of the method according to an embodiment of the inventive concept.

The method according to embodiments of the inventive concept may be to automatically perform dynamic security analysis in a mobile communication network, for example, a long term evolution (LTE) network and may include three important phases.

(1) Extracting security properties: First, an embodiment of the inventive concept may extensively analyze the LTE standards of the control plane procedures by focusing on the security aspects. Based on the analysis, an embodiment of the inventive concept may create security properties, for example, three security properties the network and the mobile devices need to follow to ensure they are protected against unknown security threats.

(2) Generating test cases: Next, an embodiment of the inventive concept may generate test cases to identify situations in which the target control plane component violates the security properties. The test cases may be generated based on the rules of target protocol messages and its fields for each security property.

(3) Classifying problematic behavior: When executing the test cases, an embodiment of the inventive concept need to determine which responses and state changes on the side of the UE are considered as problematic behavior. To this end, an embodiment of the inventive concept may build a simple decision tree logic to classify the problematic cases. A model according to an embodiment of the inventive concept may only consider the control plane logs and states on the UE side when the test case is executed. Therefore, an embodiment of the inventive concept may identify problematic cases in an automatic way using this model.

A. Extracting Security Properties from Standards

An embodiment of the inventive concept may identify potential security holes that might cause the confidentiality and integrity protection of control plane procedures be circumvented depending on the implementation and configuration policies of carriers through a thorough analysis of the specifications regarding the control plane procedures and security requirements. First, initial procedures before establishing a security context might be exploited by adversaries who are able to eavesdrop and manipulate LTE signals. Second, quite a few exceptional situations exist in which the receiving entity would accept the received control plane message without integrity protection. Third, although the specification adopts counters for the control plane protocol (such as NAS and RRC), it specifies the use of a sequence number (partial bits of the counter) in the received message when verifying the message integrity. Therefore, message replay might be allowed. From these observations, an embodiment of the inventive concept may create the three basic security properties listed in Table 1 below, each of which focuses on the ability of the responsible entities to correctly respond to malicious behavior by an adversary.

TABLE 1

| | Security property | Target procedures/messages | Example |
|---|---|---|---|
| P1 | Plain messages before the AKA procedures should not affect the existing connections | Messages that are allowed to be sent in plaintext<br>Messages that are not allowed to be sent in plaintext | RRC Connection request, IMSI Attach request<br>GUTI Attach request, Uplink NAS transport |
| P2 | Invalid security protected messages should neither be accepted nor trigger the state transition in the receiving entity | Messages with invalid integrity protection<br>Messages with invalid sequence number | PDN disconnect request, Service request |
| P3 | Mandatory security procedures should not be bypassed | Mutual authentication procedure<br>Key agreement procedure | Authentication request<br>NAS/RRC Security mode command |

An embodiment of the inventive concept assumes that the adversary has minimal privilege: the adversary neither owns valid keys to register with the LTE network nor do they have information about other legitimate users' keys. In addition, as each property focuses on different security aspects (i.e., incorrect handling of unprotected procedures, invalid security-protected messages, and mandatory AKA procedures), the test scenarios and the rules of selecting target messages vary from one property to another. Note that, when considering the security properties, an embodiment of the inventive concept may only target the NAS and the RRC protocol among the various control plane protocols because (1) these protocols are used to perform critical control plane procedures between the UE and the network (e.g., UE attach procedure, mobility management, and authentication), (2) an embodiment of the inventive concept is able to capture and analyze these procedures at the UE, and (3) the identified vulnerabilities in these protocols directly affect both the UE and the network.

Each of these properties is explained in more detail below.

1) Property 1: It confirms whether the receiving entity (e.g., the eNB or MME for an uplink and the UE for a downlink) appropriately handles unexpected inputs when an adversary sends crafted plain messages during the initial procedures. To validate this property, an embodiment of the inventive concept may consider two situations when selecting the target messages: (1) crafted plain messages capable of being sent before security is activated, and (2) messages that should not be sent unprotected after security activation according to the standard. For the first case, an embodiment of the inventive concept may mainly inspect the potential threats of initial plain messages incapable of being protected by the nature of the symmetric key cryptography of LTE. For these unprotected messages, it is hard to distinguish whether the received message is sent from the adversary user (or the adversary) or a benign user. On the other hand, the purpose of the second situation is to inspect whether the deployed cellular components are correctly implemented to reject or discard invalid plain messages that do not comply with the standard. Messages transmitted after security activation usually adhere to security critical procedures. Thus, an adversary might affect the connection state of a UE or may expose the private information of the UE when the receiving entities incorrectly handle these security-protected messages. Here an embodiment of the inventive concept assumes that the adversary neither subscribes to the particular mobile phone service nor do they have the security keys of the other UE. Therefore, the adversary would be able to create and send plain messages with arbitrary contents, but these messages are not valid ones. During the test, the adversary acts as a malicious UE when investigating the behavior of the eNB and MME (uplink direction) and as a rogue LTE network when investigating UE behavior (downlink direction).

An example of a message representing the first situation is an RRC Connection request. Because the initial RRC Connection procedure is not protected by design, an adversary may spoof any contents while establishing the RRC Connection. Victim eNBs without proper security measures would accept these fabricated messages. Another example to illustrate the second situation could be a plain NAS Attach request spoofed with the victim's globally unique temporary identity (GUTI). In normal cases, when a UE attempts to perform re-registration with their previous cryptographic key information (known as the security context in 3GPP) and GUTI, an integrity protected NAS Attach request is sent. Upon receiving the message, the MME allows UE registration without performing an AKA procedure because the UE is already authenticated by its valid integrity protected message. Thus, when the MME does not correctly check whether the received message has to be security protected, an adversary may disconnect the victim's existing connection by sending a plain NAS Attach request spoofed with the victim's GUTI.

2) Property 2: It validates whether the receiver appropriately handles unexpected messages that are incorrectly encapsulated with a security header. All NAS messages after the AKA procedure should be both encrypted and integrity protected except some messages, such as an Attach request, a TAU request, and a Security mode command, all of which are only integrity protected. To this end, when a UE sends an NAS message after the AKA procedure, it encrypts the plain NAS messages first and then calculates the message authentication code (MAC) for integrity protection. An embodiment of the inventive concept may demonstrate this property by investigating whether the receiving entity appropriately verifies the integrity of the security-protected messages and the sequence number, which consists of the eight least significant bits of the 32-bit counter value synchronized between the sending and receiving entities. Intuitively, when the receiving entity does not verify the integrity of the message, an adversary may spoof any unencrypted messages. Further, when the sequence number is not thoroughly verified, the adversary may launch a replay attack using security-protected messages that were previously captured from the victim UE. Similar to property 1, because the adversary does not have any cryptographic keys to generate valid messages, they send invalid messages after establishing a connection to the eNB. The target messages for each of the cases constitute every possible message that should be protected after security activation.

The first case relating to an example could be NAS Uplink NAS transport, which is used for SMS within the carriers providing SMS over NAS. When an MME does not properly verify the integrity of this message, the adversary may exploit it for an SMS phishing attack by spoofing the contents of the NAS Uplink NAS transport message. The second case representative of the example is an NAS PDN disconnect request. The purpose of this message is to release the established packet data network (PDN) Connection; in particular, when the user turns off his or her device or switches off the data service. An adversary could send this message to the network by pretending to be the victim UE, and the network would accept this replayed message when it does not correctly verify the sequence number specified in the message. This could lead to selective denial of service of legitimate users.

3) Property 3: It confirms whether the security procedures specified in the 3GPP standards may be bypassed by malicious UE or a network. The LTE standard adopts EPS-AKA for mutual authentication between the UE and the network for protection of both the control and data planes. This includes the NAS Authentication procedure based on the challenge-response mechanism and the Security mode command in both the RRC and NAS layers, which are session key agreement procedures for control plane and data plane confidentiality and integrity. Three types of approaches are available to inspect whether these security procedures could be bypassed. The first is to perform a security analysis of the cryptographic algorithms adopted in the LTE standard. Second, one could consider situations in which an adversary manipulates the encryption and integrity protection algorithms selected in the RRC/NAS Security mode command and security header type in NAS protected messages. The last situation involves omitting parts of the mandatory security procedures. When the device allows this to occur, a rogue LTE network without cryptographic keys for the legitimate devices could even provide manipulated services without confidentiality and integrity protection. Despite the possibility of these situations causing serious threats when exploited, the consequences have not yet been investigated and publicly disclosed. Thus, an embodiment of the inventive concept may limit the scope of this security property to validate whether the UE correctly handles situations in which a malicious LTE network omits the mandatory security procedures such as an Authentication request and a Security mode command in both the RRC and NAS layers.

An example could be to disregard the NAS Authentication request to enable an adversary to continue following service procedures without authentication and key agreement, both of which are mandatory procedures.

B. Generating Test Cases for Each Property

Although the target messages for each property are chosen, several test cases exist when an embodiment of the inventive concept considers the inputs for all possible field values in each message. For example, the generation of test cases for an invalid plain NAS Attach request to verify security property 1 would have to consider that it has 24 fields including an optional one and the available length in this message could be at least 16 bytes. Obviously, testing all these possibilities is expensive. To reduce the number of test cases and yet carry out a sufficient number to investigate the behavior of the target entity, an embodiment of the inventive concept may utilize commercial control plane message logs. In this regard, an embodiment of the inventive concept may collect various control plane messages by triggering many functionalities in the baseband chipset by sending AT commands. An embodiment of the inventive concept may then use this log to build a database which stores all the values collected for each field, separated by carriers. Thus, when the generator creates test cases for carrier A, it selects one of the possible values marked as carrier A. When generating the test cases to check sequence number verification (second case in property 2), an embodiment of the inventive concept may generate all the test cases by capturing packets on the side of the victim UE. When generating test cases for initial plain messages (property 1) and messages with invalid MAC (first case in property 2), only the mandatory fields are considered as they are security critical for correct LTE operation. Note that when the test case message contains the identity (ID) field of the UE, the current ID of the UE such as the GUTI or IMSI is included to inspect whether the receiving entity changes the state of the victim UE.

C. Classifying Problematic Behavior

When each case is tested, an embodiment of the inventive concept has to identify which of these cause problematic behavior in the receiving entity. This may easily be achieved when the operation logs of the receiving entity are available to monitor. However, obtaining the operation logs of cellular networks is not possible without support from carriers or equipment vendors. To overcome this limitation, an embodiment of the inventive concept may classify problematic behavior by monitoring only the logs in the UE based on a decision tree. This logic has two decision phases: whether the test case that is the invalid message is accepted, and whether the test case causes disconnection of the victim UE. For the first decision phase, an embodiment of the inventive concept may define the expected response when the receiving entity accepts each test case based on the 3GPP standard. Then, an embodiment of the inventive concept may check whether the expected response is received by the UE when each test case is sent. For instance, if a test case is an invalid NAS ID request, the expected response should be an NAS ID response with the desired message contents. Once this expected response is received, an embodiment of the inventive concept may consider the test case to be accepted and may classify the test case as being abnormal because a test case with invalid input should not be accepted. At the second decision phase, an embodiment of the inventive concept may further examine whether the victim UE is disconnected from the network in response to a test case. When the victim UE is disconnected from the network, it is classified as problematic, which may result in denial of service to the victim UE (case 1). If the victim UE is not disconnected from the network or it is unknown, it is also classified as problematic because this behavior could be exploited to conduct a spoofing attack (case 2). When the test case is not accepted in the first phase, the result is divided into two different cases in the second phase. When the victim UE is disconnected from the network although the test case is not accepted in the receiving entity, it is also classified as problematic behavior, which might be rooted in misbehavior of the receiving entity when it recognizes that the received message is not valid (case 3). Otherwise, the test case is classified as benign, which means the receiving entity correctly handled the invalid message (case 4). Based on this classification, an embodiment of the inventive concept may easily identify the problems and may even obtain attack scenarios. For example, the crafted messages classified as cases 1 and 3 may be exploited by an adversary to perform a DoS attack against the victim UE.

D. Ethical Considerations

Testing against operational networks: The purpose of the inventive concept is not to identify failures causing crashes or memory leaks. Instead, an embodiment of the inventive concept may focus on finding semantic failures in LTE operations. To this end, an embodiment of the inventive concept may generate all test cases that would have been correctly parsed in the receiving entities as the field values are created based on the control plane logs from the operational networks. For instance, test cases for carrier A are only created using the field values found in the control plane messages of this carrier. In addition, an embodiment of the inventive concept may only carry out the tests against the subscribed mobile phone to ensure that the tests did not affect the connection state of other legitimate users. It might only change the state of the target device into an unexpected one when the test cases according to an embodiment of the inventive concept are accepted by the receiving entity. Control plane overhead may be negligible considering the overhead of a normal situation. The only test case that may affect other UEs in the victim cell may be conducted by testing against a femtocell utilizing the frequency bands that are not used in operational networks, and testing on the testbed of the carrier.

Testing against commercial phones: A testbed operating in an LTE licensed band might influence legitimate users who are not participating in experiments according to an embodiment of the inventive concept. To prevent normal users from connecting to the testbed network, an embodiment of the inventive concept may only utilize frequency bands that are not used by operational networks. In addition, an embodiment of the inventive concept may set the transmission power of eNB to a minimum such that only the target UE within a distance of 20 cm is connected to the testbed. As a result, an embodiment of the inventive concept may confirm that no legitimate users are attempted to connect to the testbed network during the experiments.

Legal restriction: Many countries have legal restrictions that forbid unauthorized signals to be sent to commercial network systems for the purpose of disrupting their stable operation. Thus, dynamic testing of a commercial LTE network is also strictly prohibited without permission. In addition, similar to carefully generating the test cases to avoid disrupting the normal LTE services, an embodiment of the inventive concept may also confirm that the test cases according to an embodiment of the inventive concept are not problematic in terms of the availability and reliability of network components by cooperating with the carriers.

As such, the method according to an embodiment of the inventive concept may be to generate a test case causing an abnormal operation unsuitable for the control plane protocol specification, analyze a control plane message response and state change information, which are generated when executing the test case, automatically detect an abnormal operation (or vulnerabilities) of target equipment, and diagnose the cause of the abnormal operation (or vulnerabilities), thus diagnosing various security vulnerabilities of mobile communication equipment and a terminal and safely and reliably designing and implementing the mobile communication equipment and terminal in social terms.

Furthermore, the method according to an embodiment of the inventive concept may be to automatically detect and diagnose security vulnerabilities of network equipment and a terminal, which take charge of control plane protocol communication of a mobile communication network, thus preventing economic loss and enhancing security. In other words, the method according to an embodiment of the inventive concept may diagnose and address problems proactively before security threats occur in view of network operators and equipment vendors, thus preventing economic loss and enhancing security.

Much time and effort is actually required to separately and manually test the test cases created to inspect security, but generating test cases, executing the test cases, and diagnosing problems may be automated using the method according to an embodiment of the inventive concept.

Figure 7:
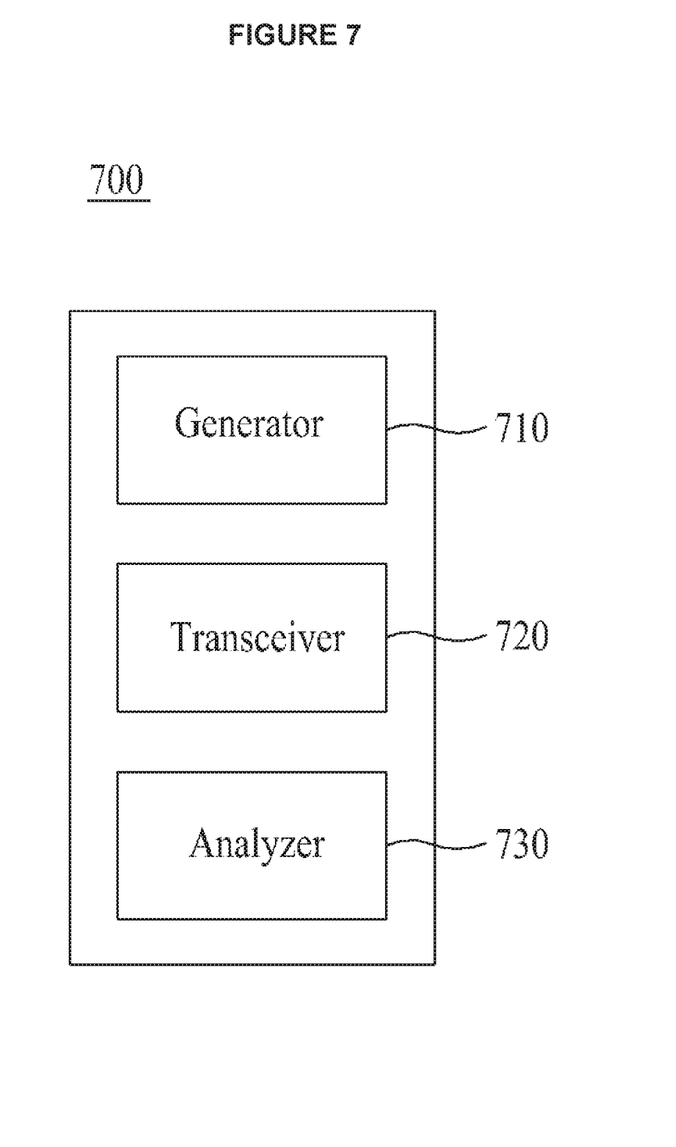
FIG. 7 is a block diagram illustrating a security analysis system for a control plane according to an embodiment of the inventive concept.

FIG. 7 is a block diagram illustrating a security analysis system for a control plane according to an embodiment of the inventive concept. FIG. 7 illustrates a conceptual configuration of a system for performing a method of FIGS. 1 to 6.

Referring to FIG. 7, a system 700 according to an embodiment of the inventive concept may include a generator 710, a transceiver 720, and an analyzer 730.

The generator 710 may generate a test case for a security property unsuitable for a control plane operation, for example, a non-standard test case.

Herein, the generator 710 may modulate a value of a specific field in a control plane protocol header into a value unsuitable for an operation on standards to generate the test case for the security property. The specific field of the control plane protocol header may include at least one of a sequence number field, a security header type field, and a message authentication code (MAC) field.

In addition, the generator 710 may modulate the value of the specific field into the value unsuitable for the operation on the standards and may fill values of the other fields with field values extracted from a mobile communication network log, thus generating the test case for the security property.

The transceiver 720 may transmit the generated test case to target equipment, for example, a terminal or communication network equipment and may receive a response to the non-standard test case from the target equipment.

Herein, the transceiver 720 may transmit the generated test case to the target equipment using an SDR and may receive the response to the test case using the SDR.

The analyzer 730 may analyze the response to the non-standard test case, received from the target equipment, to diagnose security for a security property of the target equipment.

Herein, the analyzer 730 may analyze the received response using a predefined decision tree to diagnose the security for the security property and may analyze the received response and information about a state change caused by the test case to detect an abnormal operation of the target equipment.

It is apparent to those skilled in the art that, although the description is omitted in the system 700 in FIG. 7, the respective components configuring FIG. 7 may include all details described in FIGS. 1 to 6.

According to embodiments of the inventive concept, the security analysis system may generate a test case causing an abnormal operation unsuitable for a control plane protocol specification, may analyze a control plane message response and state change information, which are generated when executing the test case, may automatically detect an abnormal operation (or vulnerabilities) of target equipment, and may diagnose the cause of the abnormal operation (or the vulnerabilities), thus diagnosing various security vulnerabilities of mobile communication equipment and a terminal and safely and reliably designing and implementing the mobile communication equipment and the terminal in social terms.

According to embodiments of the inventive concept, the security analysis system may automatically detect and diagnose security vulnerabilities of network equipment and a terminal, which take charge of control plane protocol communication of a mobile communication network, thus preventing economic loss and enhancing security. In other words, an embodiment of the inventive concept may diagnose and solve problems proactively before security threats occur, in view of network operators and equipment vendors, thus preventing economic loss and enhancing security.

According to embodiments of the inventive concept, the security analysis system may more quickly and accurately find targeted vulnerabilities using the automated dynamic security analysis technology and may automatically diagnose various vulnerability forms, as well as vulnerabilities such as message forgery, replay, and plaintext transmission, depending on a rule of generating test cases.

According to embodiments of the inventive concept, the security analysis system may apply the dynamic security analysis technology to equipment developed before a commercialized stage to analyze security of the equipment in advance, thus preventing economic loss and enhancing security technicality.

An embodiment of the inventive concept may be used to diagnose security of all control plane communication equipment of a mobile communication network.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A security analysis method for a control plane, the method comprising:
   generating a test case for a security property unsuitable for a control plane operation;
   transmitting the generated test case to target equipment and receiving a response of the control plane to the test case from the target equipment; and
   diagnosing security for the security property of the target equipment by analyzing the received response.

2. The method of claim 1, wherein the generating includes:
   generating the test case for the security property by modulating a value of a specific field in a control plane protocol header into a value unsuitable for an operation on standards.

3. The method of claim 2, wherein the specific field includes at least one of a sequence number field, a security header type field, and a message authentication code (MAC) field.

4. The method of claim 2, wherein the generating includes:
   generating the test case for the security property by modulating the value of the specific field into the value unsuitable for the operation on the standards and filling values of the other fields using field values extracted from a mobile communication network log.

5. The method of claim 1, wherein the diagnosing includes:
   diagnosing the security for the security property by analyzing the received response using a predefined decision tree.

6. The method of claim 1, wherein the diagnosing includes:
   detecting an abnormal operation of the target equipment by analyzing the received response and information about a state change caused by the test case.

7. The method of claim 1, wherein the receiving includes:
   transmitting the generated test case to the target equipment using a software defined radio (SDR) and receiving the response to the test case using the SDR.

8. A security analysis method for a control plane, the method comprising:
   generating a test case for a security property unsuitable for a control plane operation;
   transmitting the generated test case to target equipment and receiving a response of the control plane to the test case from the target equipment; and
   diagnosing security for the security property of the target equipment by analyzing the received response using a predefined decision tree.

9. The method of claim 8, wherein the generating includes:
   generating the test case for the security property by modulating a value of a specific field in a control plane protocol header into a value unsuitable for an operation on standards.

10. The method of claim 9, wherein the specific field includes at least one of a sequence number field, a security header type field, and a message authentication code (MAC) field.

11. The method of claim 9, wherein the generating includes:
    generating the test case for the security property by modulating the value of the specific field into the value unsuitable for the operation on the standards and filling values of the other fields using field values extracted from a mobile communication network log.

12. A security analysis system for a control plane, the system comprising:
    a generator configured to generate a test case for a security property unsuitable for a control plane operation;
    a transceiver configured to transmit the generated test case to target equipment and receive a response of the control plane to the test case from the target equipment; and an analyzer configured to diagnose security for the security property of the target equipment by analyzing the received response.

13. The system of claim 12, wherein the generator generates the test case for the security property by modulating a value of a specific field in a control plane protocol header into a value unsuitable for an operation on standards.

14. The system of claim 13, wherein the specific field includes at least one of a sequence number field, a security header type field, and a message authentication code (MAC) field.

15. The system of claim 13, wherein the generator generates the test case for the security property by modulating the value of the specific field into the value unsuitable for the operation on the standards and filling values of the other fields using field values extracted from a mobile communication network log.

16. The system of claim 12, wherein the analyzer diagnoses the security for the security property by analyzing the received response using a predefined decision tree.

17. The system of claim 12, wherein the analyzer detects an abnormal operation of the target equipment by analyzing the received response and information about a state change caused by the test case.

18. The system of claim 12, wherein the transceiver transmits the generated test case to the target equipment using a software defined radio (SDR) and receives the response to the test case using the SDR.

* * * * *